Patented Dec. 6, 1938

2,139,242

UNITED STATES PATENT OFFICE 2,139,242

INTAGLIO PRINTING INK

Walter W. Mock, Rutherford, N. J., assignor to Interchemical Corporation, New York, N. Y., a corporation of Ohio No Drawing. Application April 16, 1938, Serial No. 202,449

2 Claims. (Cl. 134—36)

This invention relates to printing inks and the like compositions. More particularly, it relates to very rapid drying intaglio inks containing gilsonite and the like.

I have discovered that a combination of petroleum naphthas and ketone solvents, substantially more volatile than benzol, may be used in an intaglio ink as a solvent for a large quantity of gilsonite, to produce an intaglio ink which dries much more rapidly than any intaglio inks heretofore produced, whereby full newspaper printing speeds may be attained in photogravure printing.

The petroleum naphthas which I employ have the advantage of being not only highly volatile but also non-toxic and cheap, as are the ketones of similar volatility used with them.

When employed according to my preferred proportions, these solvents form, with gilsonite, a solution, having a viscosity of from about 20 to 50 centipoises at ordinary room temperature (ca 70° F.) even though gilsonite may compose as much as one-third of the solution. The viscosities within this range are ideal for printing from intaglio plates. They are obtained when the percentage of petroleum naphtha used in the dual solvent combination ranges from 85% to 95% and the ketone solvent from 5% to 15%, and the gilsonite comprises from 15% to 30% of the ink. The ketone may be employed in larger quantities, if it is desired to increase the solvent power of the mixed solvent still further.

The least volatile petroleum naphthas used according to the invention evaporate at room temperature in about three-fourths the time required for the evaporation of benzol. They may, of course, have an upper boiling limit above that of benzol (80° C.), provided they are sufficiently more volatile. The ketones available include acetone, methyl ethyl ketone and the rapid evaporating mixed ketones obtainable by the destructive distillation of wood.

The following example illustrates my invention:

| | Parts by weight |
|---|---|
| Gilsonite | 100.00 |
| Petroleum naphtha (B. P. 60–88° C.) | 186.00 |
| Methyl ethyl ketone | 14.00 |
| | 300.00 |

This composition is an intaglio ink having a viscosity of 42 centipoises at room temperature (20–25° C.). The particular petroleum naphtha used is about one-third more volatile than benzol. The ink may be printed on paper from intaglio plates at the rate of from 1000 to 1500 feet per minute and dries thoroughly almost instantly after the ink is transferred to the paper. Thus, these inks may be applied to standard newspaper presses, and intaglio newspaper printing may be conducted at speeds comparable with ordinary newsprinting.

It will be appreciated that certain modifications may be made within the scope of my invention. The gilsonite, for instance, may be partially replaced with small amounts of other materials, such as natural and residual asphalts, which act as both binder and coloring material in the ink, and pigments may be dispersed in the ink to obtain better hiding or denser color.

What I claim is:

1. An intaglio printing ink comprising a solution of 15–30% gilsonite in a liquid component containing 85–95% petroleum naphtha more volatile than benzol and 5–15% of a ketone more volatile than benzol.

2. An intaglio printing ink containing about one-third gilsonite dissolved in a solvent mixture containing 7% by weight methyl ethyl ketone and 93% petroleum naphtha about a third more volatile than benzol.

WALTER W. MOCK.